United States Patent

[11] 3,630,451

[72] Inventor James L. Farmer
Rte. 2, Box 381, Prior Lake, Minn. 55372
[21] Appl. No. 849,733
[22] Filed Aug. 13, 1969
[45] Patented Dec. 28, 1971

[54] FLUIDIC CONTROLLED SPRINKLER
6 Claims, 11 Drawing Figs.
[52] U.S. Cl. .................................. 239/242, 239/263
[51] Int. Cl. .................................. B05b 3/16
[50] Field of Search ............................ 239/242, 263

[56] References Cited
UNITED STATES PATENTS
2,942,789 6/1960 Smith ..................... 239/242

Primary Examiner—M. Henson Wood, Jr.
Assistant Examiner—Edwin D. Grant

ABSTRACT: A fluid sprinkler or the like which includes a spray bar device with means for oscillating the spray bar which means includes an impeller attached to the bar with a fluidic control circuit arranged to direct fluid to alternate sides of the impeller and thereby control the motion of the spray bar. An inlet is provided for attaching the device to a garden hose or the like and a portion of the inlet fluid is utilized to control the impeller and the spray bar oscillation with the remainder of the inlet fluid passing directly into the controlled spray bar.

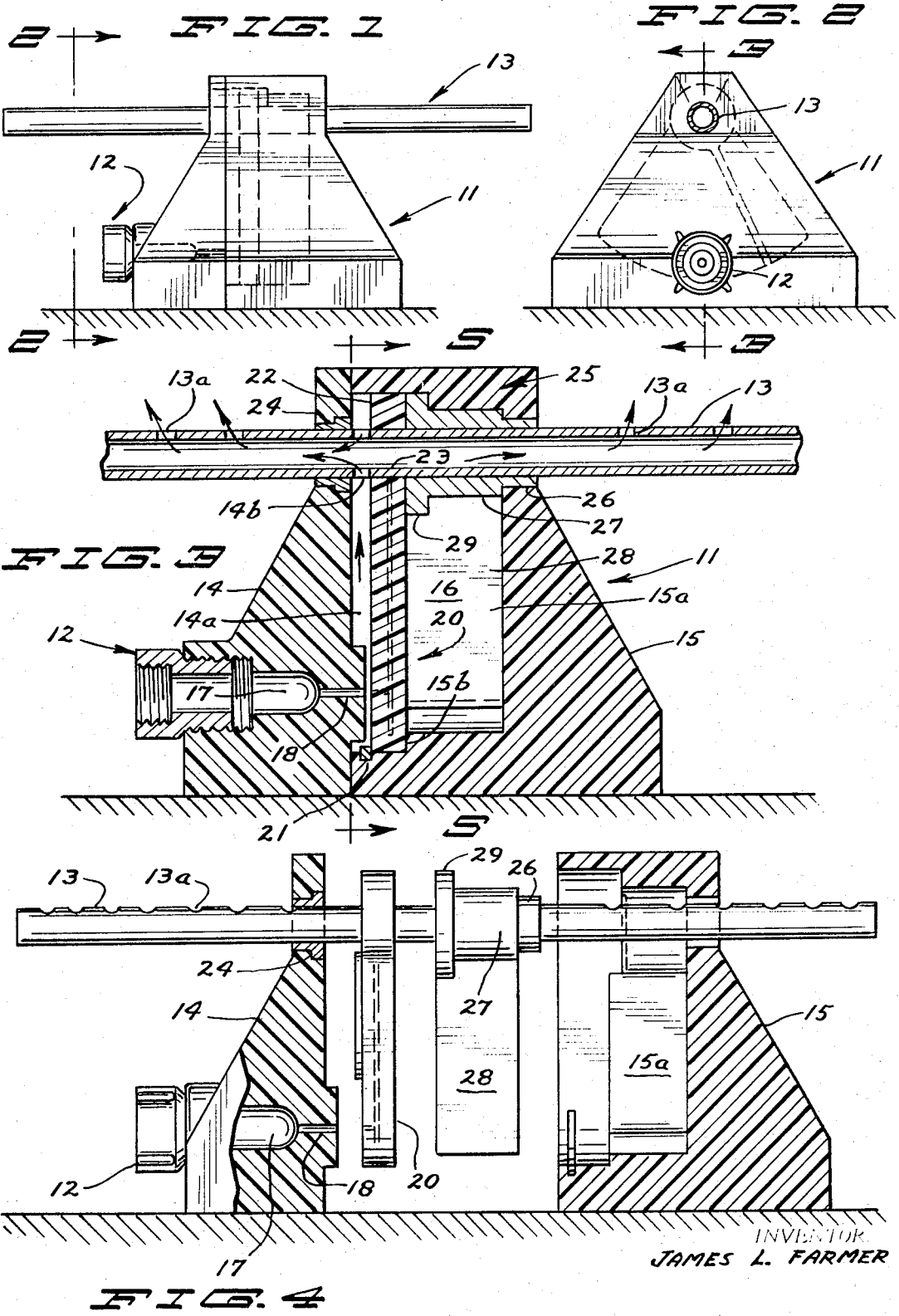

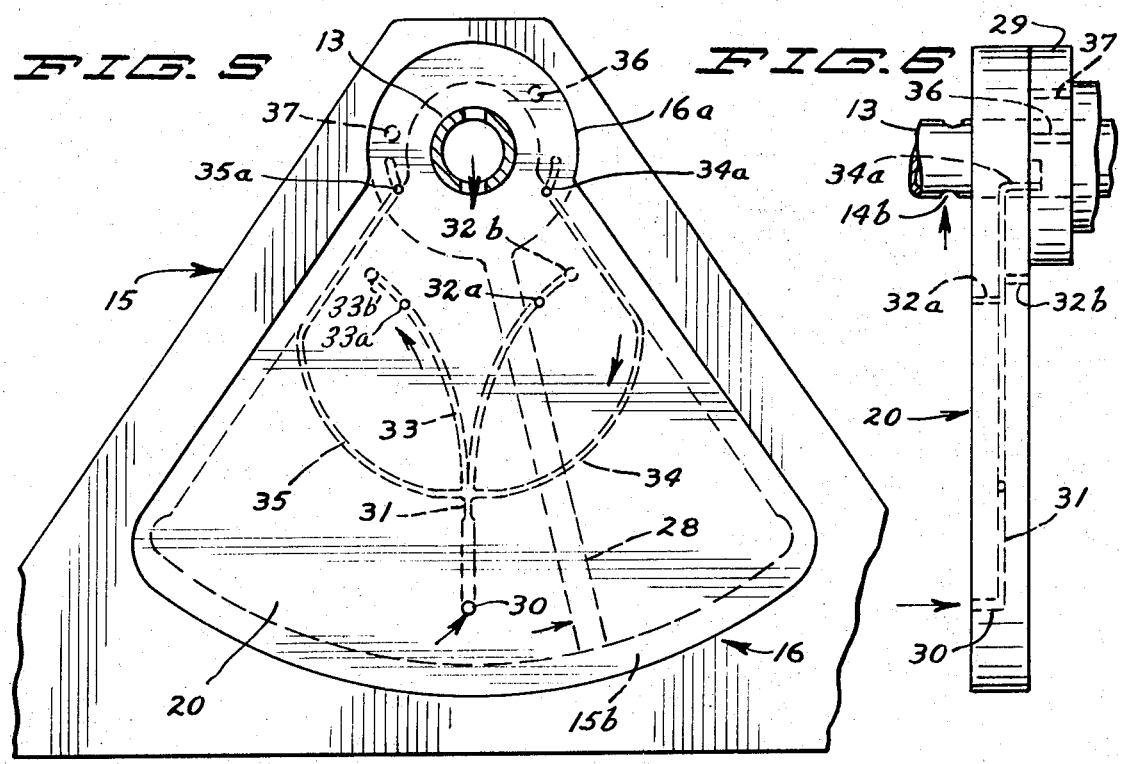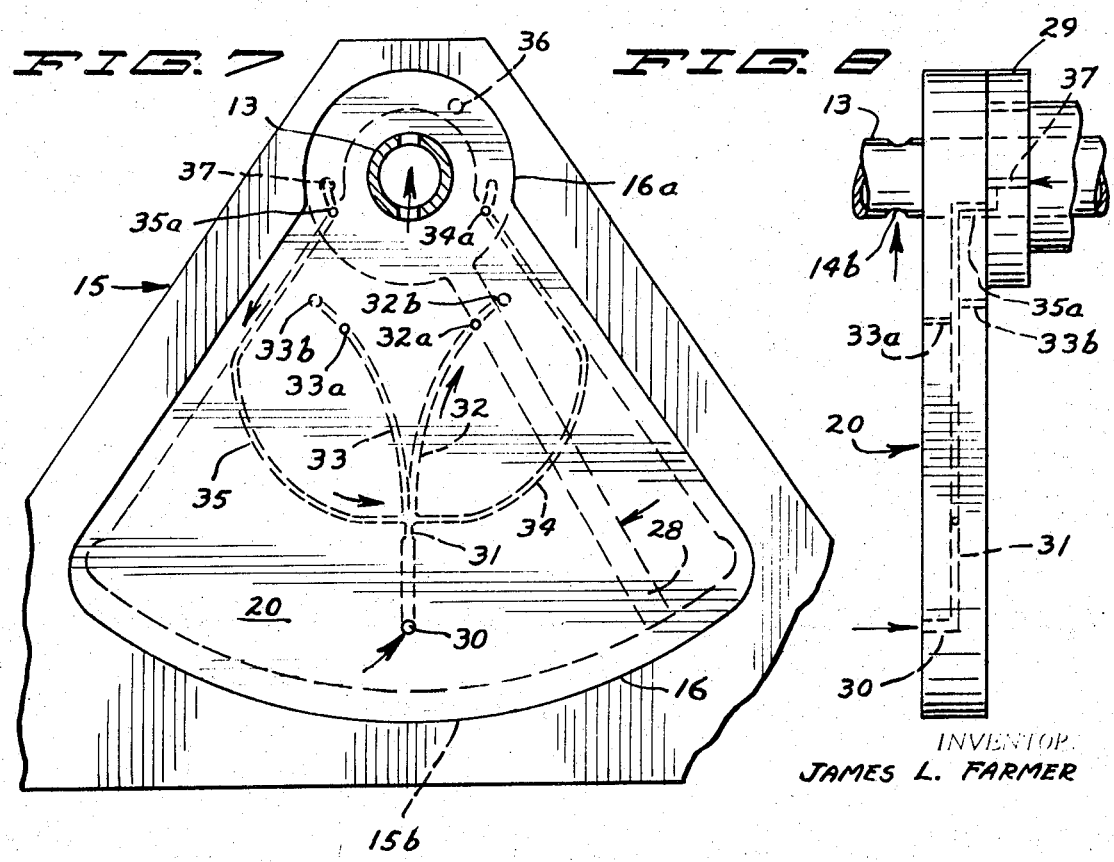

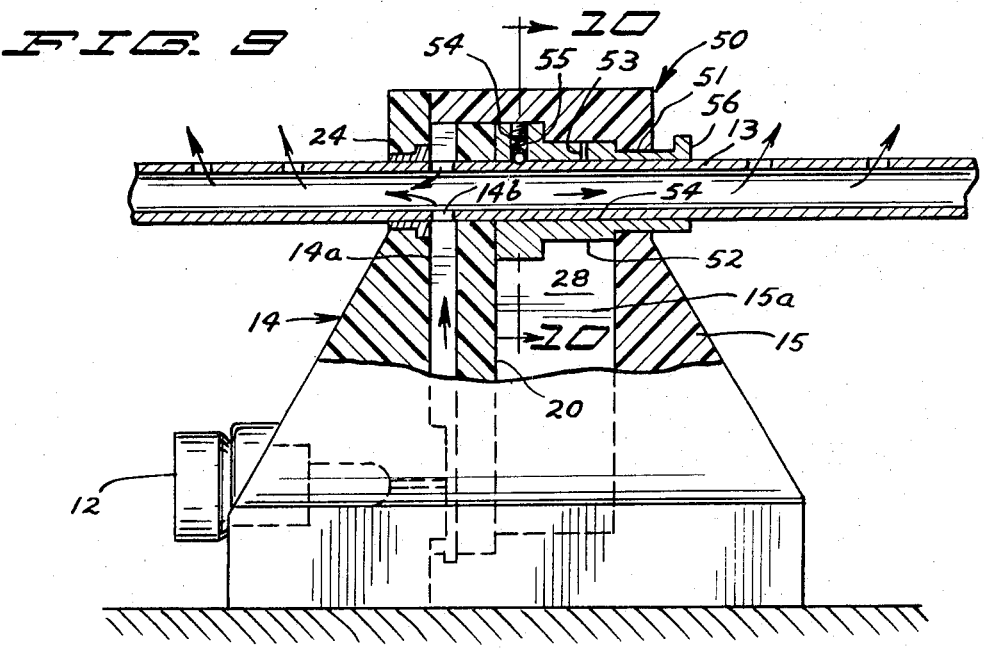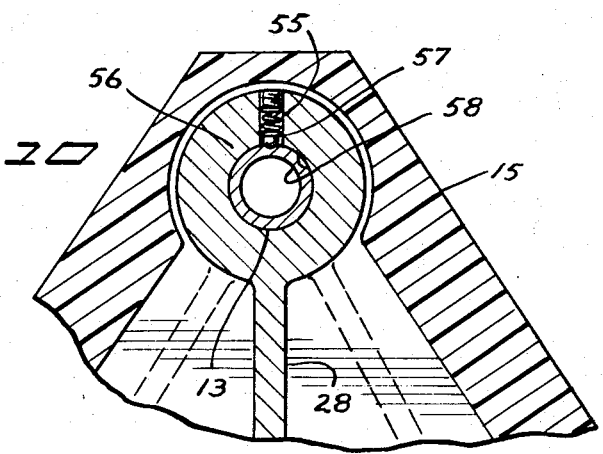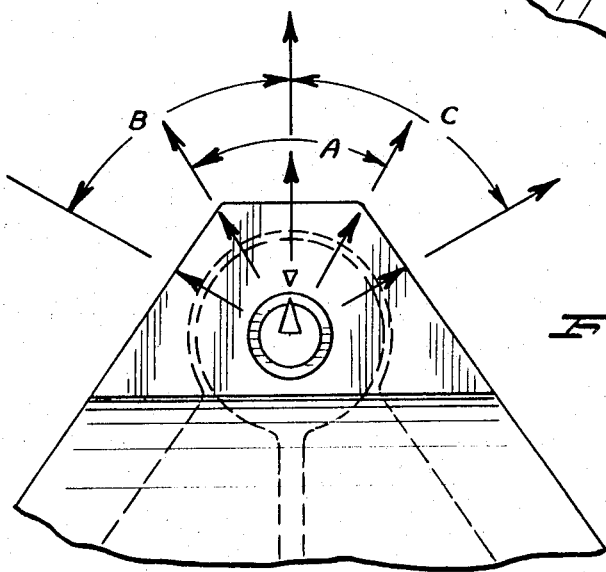

FLUIDIC CONTROLLED SPRINKLER

In the past, various lawn sprinkling devices which include oscillating or rotating spray bars have been provided. The principal of providing motion to these spray bars has included turbine-type arrangements operating on gear train systems, or has included reactionary spray nozzles directing the spray in one direction while maintaining rotation of the spray bar in an opposite direction. These systems then have incorporated mechanical features which require additional mechanical equipment or components for translating the fluidic power provided by the fluid to be sprayed which mechanical components are subject, of course, to wear and the like. Further, in utilizing mechanical components such as these now known units, certain complicated control features must be provided which have incorporated clutch devices, gear tooth shifting devices or the like. These control components, then also necessitate and provide certain wear characteristics to the unit.

Applicant has provided herein, a fluidic controlled sprinkler system wherein an oscillating spray bar is provided with an impeller device arranged to drive the oscillating spray bar and wherein a memory circuit is utilized to control the oscillation of the device. The only control feature incorporated in applicant's device is a memory disc which will initiate and control flow into the control portion of the memory circuit such that a mere shifting of the disc will control the oscillation characteristics of the spray bar. It is therefore, an object of applicant's invention to provide a fluidically controlled sprinkler system which incorporates an oscillating spray bar member controlled and moved by an impeller device with means for controlling fluid introduction to opposite sides of the impeller device whereby the oscillating spray bar will move as dictated by the introduction of the fluid.

It is, therefore, an object of applicant's invention to provide an oscillating sprinkling system which incorporates a fluidic memory circuit for producing the desired oscillation of the spray bar unit.

It is a further object of applicant's invention to provide a fluidic sprinkler system wherein a portion of the inlet fluid is utilized to control and actuate the oscillating sprinkler unit provided therewith and another portion of the inlet fluid provides the fluid being sprayed from the spray bar.

It is a further object of applicant's invention to provide a fluidic controlled sprinkler wherein a memory circuit is controlled through placement of a control disc to direct fluid into the control Y-portion of the fluidic circuit to thereby direct control fluid to the properly selected side of an impeller device.

It is a further object of applicant's invention to provide a fluidically controlled sprinkler system wherein alternating rotative motion of a sprinkler bar member is controlled through introduction of fluid alternately to the sides of an impeller device with the entire operation thereof controlled through a stationery memory fluidic circuit.

These and other objects and advantages of the invention will more fully appear from the following description made in connection with the accompanying drawings, wherein like reference characters refer to the same or similar parts throughout the several views, and in which:

FIG. 1 is a side elevation of a fluidic sprinkler embodying the concepts of applicant's invention;

FIG. 2 is a front elevation of the unit illustrated in FIG. 1;

FIG. 3 is a vertical section taken substantially along line 3—3 of FIG. 1;

FIG. 4 is an exploded view of the parts and portions of the device as illustrated in the cross section of FIG. 3;

FIG. 5 is a transverse section taken substantially along line 5—5 of FIG. 3;

FIG. 6 is a side elevation of the circuit plate corresponding to the position illustrated in FIG. 5;

FIG. 7 is a view similar to FIG. 5 showing the motion of the impeller device in the opposite direction;

FIG. 8 is a view similar to FIG. 6 illustrating the fluid flow in the memory plate;

FIG. 9 is a partial section similar to FIG. 3 illustrating a modified form of the invention;

FIG. 10 is a transverse view taken substantially along line 10—10 of FIG. 9; and, FIG. 11 is a diagrammatic illustration of the adjustment features of the control disc of the modified unit.

In accordance with the accompanying drawings, the fluidic sprinkler embodying the concepts of applicant's invention, including a body section generally designated 11 and an inlet 12, to which a garden hose or the like is attached and a spray bar section 13. The inlet water obviously enters through the inlet 12 into the body 11 where it is utilized to control the motion of the spray bar 13 and also is sprayed from the spray bar 13. As best illustrated in the cross section of FIG. 3 and 4, the body portion 11 includes a pair of housing members 14-15 having cavities 14a, 15a respectively formed in the mating front surfaces thereof to provide a control and flow cavity which cavity is generally designated 16 therein. The two halves of the unit 14-15 may be joined by many obvious mechanical or other methods.

Inlet fluid is received into the inlet coupling 12 and proceeds through an inlet passage 17 which passage decreases in diameter to an injecting passage 18 arranged adjacent the cavity 16. The purpose of this injection passage 18 is to provide alignment and flow directive qualities to the inlet fluid such that at least a selected portion of the inlet fluid will be directed into a memory plate generally designated 20.

The particular configuration utilized in the cavity 16 is best illustrated in FIGS. 5 and 7 which show a generally triangular configuration having a rounded control section 16a at the upper end thereof. Control memory circuit plate 20 is particularly designed to be received into the cavity 16 and to more particularly abut with a shoulder 15b provided at the frontal edge of the aforementioned cavity 15a. To further hold the memory plate 20 in position, a stop member such as the pin element or plate element 21 is arranged at the lowermost surface of the housing member 15. The uppermost portion of the memory plate which portion is designated 22, is provided with a passage 23 therein to permit the spray bar member 13 to oscillate freely therein while the memory plate 20 remains stationary.

The spray bar 13 is bearingly mounted in the front body member 14 with a shouldered bearing 24. The other end of the spray bar 13 is mounted through a fixed bearing element generally designated 25 which element is in the preferred form of the invention, fixedly attached to the spray bar 13 to rotate therewith. This particular bearing element 25 includes three specific sections. The first section is designated 26 and serves as a simple bearing and locating member between itself and the block housing portion 15; the second section is designated 27 and again serves a locating purpose as well as providing a mounting surface for an impeller member 28 attached to the bearing member 25 and the third of which 29 provides a locating function and a fluid control function as will be explained hereinafter which fluid control function is in cooperation with the memory plate 20.

Memory plate 20 is provided with internal passages consisting of an inlet passage 30 which passage is in aligned relationship to the injector passage 18 to permit a certain quantity of water received into the unit to enter the fluidic control area in plate 20 while a second portion of the water will pass into the cavity 14a formed in housing 14 and upwardly into a spray bar entrance passage 14b where it will be sprayed from the various holes 13a which are formed in the spray bar.

Flow from the entrance passage 30 is directed into a fluidic Y 31 which Y is divided into a right 32 and left branch 33. These branches are provided with pairs of apertures respectively designated 32a—32b—33a—33b. It should be noted that passages 32a and 33a exit back into the cavity 14a while the passages 32b-33b deliver fluid into the impeller-confining chamber 15a on the opposite side of the memory plate 20.

Two control branches respectively designated 34-35 are also provided and these passages are provided to direct water back from the cavity 15a into the Y area for shifting of the fluidic passage to the right or left side branch. The branches 34-35 extend into the cavity 15a, but are normally closed by the aforementioned control disc portion 29 of the bearing member 25. Control passages 36-57 are provided through the control-disc portion 29 of the bearing 25 such that as this disc portion 29 is rotated by the impeller 28, one of the passages 36 or 37 will come into communication with either passage 34a-34 or 35a-35 to deliver fluid into the Y control area.

The basic concept behind the operation of this preferred form of the invention is as follows. As water enters the injection passage 18, a portion of this water will enter into the inlet 30 of the memory plate 20 and a portion will be directed into the area 14a forward of the memory plate 20. Naturally, this water entering channel 14a will pass directly into the spray tube 13 and be discharged from the apertures 13a therein. The portion of the fluid entering the inlet 30 will, for example, utilizing the comparison of FIG. 5 and 7, pass into the Y area 31 and into the left branch 33 thereof to exit into the chamber 15a through passage 33b.

To insure that such fluid will flow into the passage 15a it may be necessary to provide a reduced resistance flow with comparisons to the passage 33a and for this reason, the passage 33b may be as illustrated, slightly larger in diameter than passage 33a. The fluid flowing into the compartment 15a in this figure will enter to the left of the impeller 28 and will serve to move the impeller 28 and the spray bar 13 in a counterclockwise direction or, as illustrated in the figure, to the right. Fluid will be exhausted from the right side of the impeller 28 into the passage 32b and will exit through passage 32a into the chamber 14a where it will be carried along with the fluid passing into openings 14b and the spray bar 13. It should be noted that the particular location of the passages 36-37 on the control surface 29 of the bearing support 25 at this time prevent the flow of fluid through either of the control passages 34-35. Upon the impeller 28 being rotated to a predetermined position, the passage 37 will align with passage 35a, there being an offset arrangement provided to afford such communication and fluid will now pass from the left side of the impeller 28 into the passage 35 where it will be directed into the Y control area. Upon this control fluid impinging upon the fluid passing into branch 33 a shifting or switching will occur to now direct this same inlet fluid into passage 32 to finally exit from the passage 32b which as illustrated in FIG. 7, is on the right side of the furtherest movement of the impeller 28. This fluid flow into the right side of the impeller 28 will force the same back in now a clockwise direction. At the same time as the impeller 28 is being moved in a clockwise direction, water will be forced from the left side of the compartment 15a into the opening 33b and exit from the passage 33 through opening 33a into compartment 14a.

Upon a completion movement of the impeller 28 in its clockwise direction, the aperture 36 in the control plate 29 will meet with passage 34a to direct water into the Y area to again switch the control fluid into branch 33. In this manner then, the the oscillating effect is obtained by proper location of the control branches and proper arrangement of the control plate 29 with respect thereto.

A modified form of the invention is provided in FIGS. 9, 10, and 11 wherein the housing again consists of sides 14-15. An impeller 28 is provided within compartment 15a and a frontal flow compartment 14a is provided to deliver fluid into spray tube 13 by entering the same through passages 14b. The memory plate 20 is again provided and the primary difference in this particular arrangement is the utilization of an adjustable control plate and bearing member. In the previous description this particular control was designated 25, but for the purpose of this further description, the unit is now designated in its entirety 50 and again provides a shouldering and bearing surface 51 mounted in the housing 15 with the second shouldering element 52 now being provided with a pin member of the like 53 extending radially therethrough to match with and align with a slot 54 provided circumferentially around the spray tube 13. Control area 54 of this particularly designed control is provided with a spring-loaded ball member 55 which ball member is received into a plurality of detents designated 56-57-58 on the periphery of the spray tube 13. It should be obvious that this type of detent situation will allow selective capturing of the spray tube in the bearing member 50 and to permit shifting of these parts relative to one another a control knob 56 or the like which may be provided with indicating devices is provided on the external end of the member 50. A schematic illustration of the operative association of the detents with the spray bar is illustrated in FIG. 11 wherein the selective positioning of the unit will cause the aforementioned apertures 36-37 of the control cam portion 54 to align with the control apertures 34a-35a of the circuit plate 20 at different locations. For example, utilizing the center detent 57 the area of oscillation is determined as A, utilizing the detent 58 the oscillation situation will be area B and using the detent 56 the area of oscillation will be area C. It should be obvious that many other possible variations are available with the particular construction utilized with the primary aspect of the control plate being to control the cooperation of fluid flow into the switching passages 34-35.

It should be obvious that applicant's device provides an oscillating mechanism which eliminates the ordinary mechanical devices utilized to obtain such oscillation such as turbines or the like and which rather relies purely upon the fluid flow passing into and through the sprinkler unit. Obviously, this type of nonmechanical arrangement insures long-lasting performance from the unit while resulting in a unit which should be extremely inexpensive to produce.

What is claimed is:

1. A fluid sprinkler or the like including:
   a. a body defining a cavity therein;
   b. an inlet directing fluid into said cavity;
   c. a spray bar arranged for rotation in said cavity;
   d. an impeller arranged in said cavity attached to said spray bar for movement thereof;
   e. means in said body directing at least a portion of said inlet fluid to one side of said impeller whereby said impeller and said spray bar rotate in one direction for a predetermined arcuate dimension and thereafter directing said fluid to one second side of said impeller to impart motion in the other direction;
   f. said fluid directing means including fluid passage means having a pair of branches extending respectively to opposite sides of said cavity whereby fluid may be directed to opposite sides of said impeller;
   g. at least a first control passage and a second control passage extending from said opposite sides of said cavity to the junction of said fluid passage branches;
   h. valving means controlling the flow through said control passages; and
   i. said valving means permitting communication in response to the position of said impeller whereby fluid flow to opposite sides of said impeller is controlled by directing the same into an opposite branch.

2. The structure set forth in claim 1 and said valving means opening communication is said first control passage when said inlet fluid has substantially filled one side of said cavity whereby fluid switching will occur to switch fluid to fill a second side of said cavity and closing communication when said impeller is moved by said fluid introduction.

3. The structure set forth in claim 2 and said valving means opening communication in said second control passage when said inlet fluid has substantially filled said second side of said cavity whereby fluid switching will occur to switch fluid to fill said one side of said cavity and closing communication when said impeller is moved by said fluid introduction.

4. The structure set forth in claim 3 and said fluid-directing means constructed and arranged in a control circuit plate arranged to divide said cavity into at least a flow portion and an impeller housing portion, said second portion of said inlet fluid being directed into said flow portion.

5. The structure set forth in claim 3 and said valving means including a control disc member having control passages therethrough arranged for controlled rotation with said spray bar and said impeller.

6. The structure set forth in claim 5 and said impeller being selectively positionable with respect to said spray bar whereby said arcuate dimension of rotation may be controlled.

* * * * *